United States Patent [19]

Orzel

[11] 4,007,665
[45] Feb. 15, 1977

[54] BRAKE BOOSTER WITH IMPROVED PEDAL FEEL CHARACTERISTICS

[75] Inventor: Edward S. Orzel, Parma, Ohio

[73] Assignee: The Weatherhead Company, Cleveland, Ohio

[22] Filed: Nov. 28, 1975

[21] Appl. No.: 635,858

[52] U.S. Cl. ............................. 91/391 R; 91/433; 91/460
[51] Int. Cl.² .................. F15B 13/10; F15B 17/02
[58] Field of Search .................. 91/391 R, 460, 433

[56] References Cited
UNITED STATES PATENTS

| | | | |
|---|---|---|---|
| 3,831,491 | 8/1974 | Thomas | 91/460 |
| 3,838,629 | 10/1974 | Meyers | 91/460 |
| 3,915,066 | 10/1975 | Thomas | 91/391 R |
| 3,921,502 | 11/1975 | Lauer | 91/391 R |

Primary Examiner—Paul E. Maslousky
Attorney, Agent, or Firm—McNenny, Pearne, Gordon, Gail, Dickinson & Schiller

[57] ABSTRACT

A motor vehicle fluid power circuit is provided with a constant displacement pump, a control valve, an open-center steering valve, and a hydraulic ratio type brake booster. The control valve includes a control spool which controls fluid flow between the pump and the brake booster and between the pump and the steering valve. A control spool modifying means modifies the operation of the control spool during initial actuation of the brake pedal to produce a large increase in brake booster pressure.

16 Claims, 3 Drawing Figures

BRAKE BOOSTER WITH IMPROVED PEDAL FEEL CHARACTERISTICS

BACKGROUND OF THE INVENTION

This invention relates to a motor vehicle hydraulic fluid power circuit having a hydraulic pump for supplying fluid pressure to assist the operator in steering and braking the vehicle.

Motor vehicles are frequently provided with a hydraulic pump which is driven by the engine of the vehicle to provide a source of fluid power. In passenger cars, this source of fluid power may be used in a fluid power circuit to assist the operator in steering the vehicle and to assist the operator in braking the vehicle.

In such motor vehicle fluid power circuits, it is also desirable to provide one ratio of brake pedal movement to master cylinder movement under normal operating conditions and to provide a different ratio in the event of a fluid pressure failure in the system. This is desirable because one such ratio will provide the brake pedal movement and brake pedal feel characteristics to which drivers are now accustomed with vacuum actuated braking systems, while a different ratio is required to provide high braking pressures with low pedal effort in the event of pump failure.

In order to provide one ratio of brake pedal movement to master cylinder movement during normal operation and a second ratio in the event of pump failure, both mechanical and hydraulic ratio change devices have been proposed. Mechanical ratio change brake boosters are shown in U.S. Pat. Nos. 3,733,966 and 3,733,968. Hydraulic ratio change brake boosters are shown in U.S. Pat. No. 3,793,829 (which provides a ratio change at the outlet end of the brake booster) and in U.S. Pat. Nos. 3,831,491 and 3,838,629 (which provide a ratio change at the inlet end of the brake booster). Another hydraulic ratio change brake booster is shown in applicant's copending U.S. patent application Ser. No. 594,804 filed July 10, 1975, and assigned to the assignee of this application. An annular sleeve for changing the ratio between inlet and outlet pressure of a brake line pressure valve is shown in U.S. Pat. No. 3,832,007.

SUMMARY OF THE INVENTION

The present invention provides an improvement for hydraulic ratio change brake boosters which modifies the operation of the brake booster to provide increased brake booster pressure at low brake pedal efforts and which does not further alter the operation of the brake booster at higher brake pedal efforts. This improvement is particularly advantageous in passenger cars having automatic transmissions, since the operator is able to prevent creeping of the passenger car with a low brake pedal effort when the transmission is engaged and the passenger car is temporarily stopped.

According to a first feature of the invention, the motor vehicle fluid power circuit includes a pump, a control valve downstream of the pump, and a brake booster and steering valve downstream of the control valve. The control valve includes a control spool which controls fluid flow between the pump and the brake booster and between the pump and the steering valve. The brake booster includes a power piston which is actuated by pressure from the pump to actuate the brakes of the vehicle.

The brake booster also includes a trapped volume or constant volume chamber, and the pressure of the trapped volume chamber acts on one end of the control spool to increase the fluid pressure supplied to the brake booster. An input rod having a relatively large area and an output rod connected to the power piston and having a relatively small area are slidably disposed in the trapped volume chamber to provide the proper ratio of input rod movement to output rod movement for normal power actuation of the brake booster. Thus, when the input rod is advanced in the trapped volume chamber by actuation of the brake pedal, pressure increases in the trapped volume chamber. This increased pressure in the trapped volume chamber acts on the control spool to increase the pressure supplied to the brake booster power piston.

A control spool modifying means modifies the operation of the control spool at low or initial brake pedal efforts to provide increased brake booster pressure. At higher brake pedal efforts, the modifying means engages a stop to prevent further modification of the operation of the control spool. The modifying means is an annular sleeve having one end exposed to trapped volume pressure. At low brake pedal eforts, the trapped volume chamber pressure acting against the annular sleeve produces a force which is directed against the control spool by a collapsible spring to increase the pressure supplied to the brake booster. When a predetermined brake pedal effort is reached, the spring collapses and the modifying sleeve engages a stop. Further increases in trapped volume chamber pressure resulting from further increases in brake pedal effort then provide unmodified increases in brake booster pressure by unmodified operation of the control spool.

According to a second feature of the invention, the control spool and modifying means permit a single brake booster to provide a wide variety of relationships between brake pedal effort and brake booster output force without changing the brake booster power piston or trapped volume chamber or input rod or output rod. This permits a single brake booster to be utilized for installation on a wide variety of motor vehicles each having its own required relationship between brake pedal effort and brake booster output force.

The modifying means is concentrically disposed on the exterior of the control spool, and the modifying means and control spool are removably disposed in a control valve bore. The original control spool and modifying means in the bore which provide a first relationship between brake pedal effort and braking force are replaceable with alternate control spools and modifying means which provide entirely different relationships between brake pedal effort and braking force. When the original control spool and modifying means are replaced by a first alternate control spool having a smaller area exposed to trapped volume chamber pressure and a first alternate modifying means having a larger area exposed to trapped volume chamber pressure, low brake pedal efforts result in the same increased brake booster pressure as with the original control spool and modifying means. However, at higher brake pedal efforts the first alternate control spool provides smaller increases in brake booster pressure than the original control spool. Similarly, the original control spool and modifying means are also replaceable with a second alternate control spool and modifying means which, at higher brake pedal efforts, provide larger increases in brake booster pressure than the original control spool.

BRIEF DESCRIPTION OF THE DRAWINGS

These and other features and advantages of the present invention will be more readily apparent to those skilled in the art upon an understanding of the invention shown in the accompanying drawings, wherein.

DETAILED DESCRIPTION OF THE DRAWINGS

Figures 1, 2, 3:
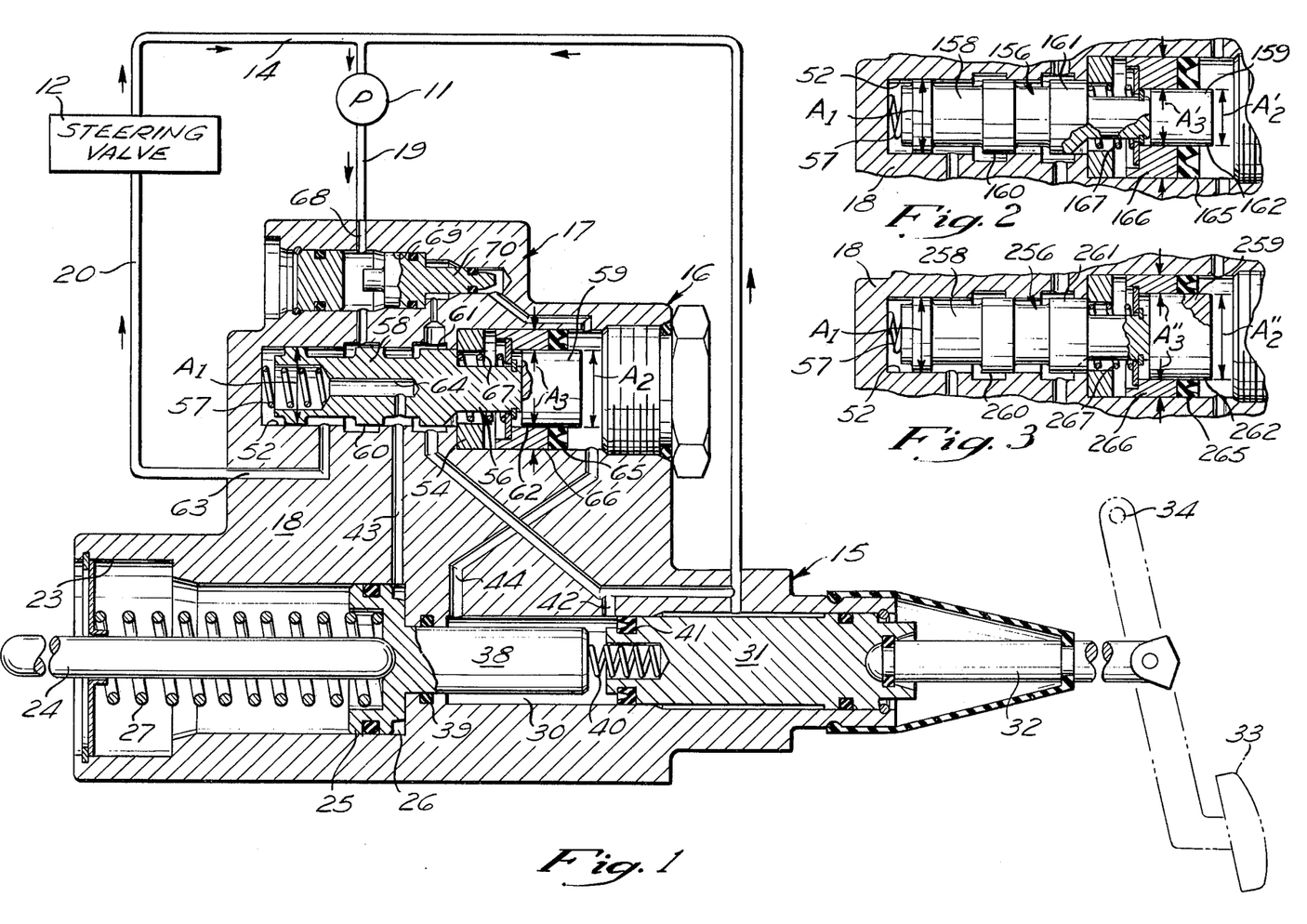
FIG. 1 is a view of a motor vehicle fluid power circuit according to the principles of the invention, with the brake booster and control valve and modifying means shown in cross-section, and with the circuit shown at least partially schematically to simplify the description and to assist in understanding the invention.
FIG. 2 is a cross-sectional view of a first alternate control spool and modifying means which may be used in the circuit shown in FIG. 1.
FIG. 3 is a cross-sectional view of a second alternate control spool and modifying means which may be used in the circuit shown in FIG. 1.

Referring now to the drawings in greater detail, FIG. 1 illustrates a fluid power circuit in a motor vehicle according to the principles of the invention. The circuit includes a constant displacement pump 11 which is driven by the engine of the motor vehicle (not shown), and in the preferred embodiment the pump 11 is a constant displacement pump having an output of 2.5 gallons per minute and is of the type commonly used in passenger car power steering systems at the present time.

The circuit shown in FIG. 1 also includes a steering valve 12 which is of the type conventionally used in passenger cars at the present time. The steering valve 12 is an opencenter valve which directs the fluid which it receives back to the pump 11 through a return line 14 when the steering valve 12 is in its neutral or center position. When fluid from the pump 11 is required to assist in the steering of the vehicle and the steering valve 12 is displaced from its center position, the steering valve 12 directs at least some of the fluid received from the pump 11 to assist the operator in steering the vehicle in a well-known manner.

The circuit shown in FIG. 1 also includes a brake booster 15, a control valve 16, and a ratio override valve 17 arranged in a cast iron housing 18. The brake booster 15 and control valve 16 and ratio override valve 17 are hydraulically connected by suitable internal conduits or passages in the housing 18 in a manner described below. A suitable line 19 carries fluid from the outlet side of the pump 11 to the control valve 16. A line 20 carries fluid from the control valve 16 to the steering valve 12 as also described below.

The brake booster 15 includes a cylindrical bore 23 extending from end to end through the housing 18. A master cylinder actuating rod 24 extends axially through a larger diameter portion of the bore 23 and transmits forces between a cylindrical power piston 25 and a conventional master cylinder (not shown) to actuate and deactuate the hydraulic brakes of the vehicle. The power piston 25 and the larger diameter portion of the bore 23 cooperatively define a power chamber 26. The power chamber 26 receives pressurized fluid from the pump 11, and the pressurized fluid exerts a hydraulic force against the power piston 25 to move the power piston 25 to the left when the brakes of the vehicle are to be actuated in a manner described below.

The return spring 27 biases the power piston 25 to the right as viewed in FIG. 1 when the brakes of the vehicle are deactuated.

At the right end of the bore 23, a trapped volume or substantially constant volume chamber 30 is provided. An input rod 31 is slidably disposed in the trapped volume chamber 30, and a suitable snap ring at the right-most end of the bore 23 retains the input rod 31 in the trapped volume chamber 30. A suitable mechanical link 32 mechanically connects the input rod 31 to a brake pedal 33 which is pivotally mounted at a pivot point 34 for actuation by the foot of the operator.

An output rod 38 is also slidably disposed in the trapped volume chamber 30 an is rigidly connected to the power piston 25. A suitable seal 39 sealingly engages the exterior peripheral surface of the output rod 38 to prevent fluid leakage between the trapped volume chamber 30 and the power chamber 26 through the bore 23. A spring 40 maintains a preselected spacing between the right end face of the output rod 38 and the left end face of the input rod 31 when the brake booster 15 is deactuated. Under normal operating conditions, these end faces do not engage one another. The left end of the input rod 31 carries a seal 41 which closes a return passage 42 when the input rod 31 is moved to the left from its deactuated position shown in FIG. 1. This closing of the return passage 42 by the seal 41 occurs before the input rod 31 engages the output rod 38. When the input rod 31 is deactuated, the seal 41 opens the return passage 42 to the trapped volume chamber 30 to communicate the trapped volume chamber 30 to the return line 14. The rightmost end of the bore 23 is slightly enlarged to prevent damage to the seal 41 upon installation of the input rod 31, and this slightly enlarged portion of the bore 23 is vented to return line pressure under all conditions.

The input rod 31 has a net lateral cross-sectional area exposed to fluid pressure in the trapped volume chamber 30 which is substantially greater than the net lateral cross-sectional area of the output rod 38 exposed to such pressure. For this reason, if the volume in the trapped volume chamber 30 remains constant, any movement of the input rod 31 to the left will necessitate a movement by the output rod 38 which is greater than such movement of the input rod 31 by a factor which is equal to the ratio of the area of the input rod 31 to the area of the output rod 38, since the fluid in the trapped volume chamber is substantially incompressible.

The brake booster 15 also includes an inlet passage 43 which receives fluid from the pump 11 and control valve 16 to supply such fluid to the power chamber 26. A control and override passage 44 establishes fluid pressure communication between the trapped volume chamber 30 and the control valve 16 and ratio override valve 17 for purposes described below.

As further shown in FIG. 1, the control valve 16 includes a machined stepped bore 52 extending from its right end. The right end of the bore 52 is sealingly closed by a suitable removable plug 53. An abutment member 54 is press fit in the bore 52 to provide a suitable stop. The member 54 does not move in the bore 52 but remains in the position shown in FIG. 1 under all conditions.

A control spool 56 is slidably disposed in the bore 52 and is biased to the right against the abutment member 54 as viewed in FIG. 1 by a light biasing spring 57. The spool 56 is of two-piece construction and includes a left cylindrical spool portion 58 and a right cylindrical spool portion 59. An axially protruding reduced diameter end of the left spool portion 58 engages the right spool portion 59, so that the spool portions 58 and 59 move together under all conditions.

The control spool 56 includes a first land 60, a second land 61, and a third land 62. The left edge of the first land 60, in a manner discussed in detail below, controls fluid pressure communication between a pump passage 68 (which is connected to the outlet side of the pump 11 by the line 19) and a steering valve passage 63 (which is in open fluid pressure communication with the inlet side of the steering valve 12 through the line 20). The right edge of the first land 60, in a manner also discussed in detail below, controls fluid pressure communication between the pump passage 63 and the brake booster inlet passage 43. The second land 61, in a manner also discussed in detail below, controls fluid pressure communication between the brake booster inlet passage 43 and the return passage 42. Because the first and second lands 60 and 61 must be precision machined to provide a lap fit in the nominal diameter portion of the bore 52 while the third land 62 does not require such precise machining, the arrangement of the first and second lands 60 and 61 on the left spool portion 58 and the third land 62 on the right spool portion 62 contributes to the economical manufacture of the control spool 56. Still referring to FIG. 1, the entire left end face of the control spool 56 of net lateral cross-sectional area $A_1$ is exposed to the pressure in the brake booster power chamber 26 under all conditions through the passage 43 and through a radial and axial passage 64 in the control spool 56. The entire right end face of the control spool 56 of net lateral cross-sectional area $A_2$ is exposed to pressure in the trapped volume chamber 30 under all conditions through the control and override passage 44. As shown in FIG. 1, the areas $A_1$ and $A_2$ are equal.

The control valve 16 also includes a modifying means which modifies the operation of the control spool 56 in a manner described below. The modifying means includes an annular seal 65 and a modifying sleeve 66. The modifying sleeve 66 includes a leftward facing annular shoulder which engages a washer slidably disposed on the reduced diameter end of the left control spool portion 58. A preloaded modifying spring 67 acts between the left control spool portion 57 and the washer, and the washer is retained on the left control spool portion 57 by a suitable snap ring. The right side of the modifying sleeve 66 has an annular cross-sectional area $A_3$ exposed to pressure in the trapped volume chamber 30 under all conditions as explained in greater detail below. The left side of the modifying sleeve 66 has an annular lateral cross-sectional area $A_3$ exposed to return passage pressure under all conditions through the return passage 42 and past the right edge of the second land 61.

The ratio override valve 17 includes a machined stepped bore 69. A dual diameter override piston 70 is slidably disposed in the bore 69. A suitable seal on the larger diameter portion of the piston 70 sealingly engages the larger diameter portion of the bore 69, and another seal provides sealing engagement between the smaller diameter portion of the bore 69 and the smaller diameter portion of the piston 70. The larger diameter left end face of the override piston 70 is exposed to pump pressure under all conditions through the pump passage 68, and the smaller diameter right end face of the piston 70 is exposed to trapped volume pressure under all conditions through the control and override passage 44. The intermediate differential diameter portion of the piston 70 is exposed to return line pressure through the return passage 42 under all conditions.

Referring now to FIG. 2, a first alternate control spool and modifying means for use in the bore 52 in the housing 18 is shown. A first alternate control spool 156 includes a left spool portion 158 having a first land 160 and a second land 161 identical to the left spool portion and first land and second land of the embodiment shown in FIG. 1. A right spool portion 159 differs from the right spool portion 59 in the embodiment shown in FIG. 1, in that the right spool portion 159 has a net lateral cross-sectional area $A_2'$ exposed to trapped volume pressure which is substantially less than the area $A_2$ of the left spool portion 158 exposed to brake booster power chamber pressure.

The first alternate modifying means shown in FIG. 2 includes a seal 165 and a sleeve 166 having a net lateral cross-sectional area $A_3'$ exposed on its right side to trapped volume chamber pressure and exposed on its left side to return passage pressure. The area $A_3'$ is substantially greater than the area $A_3$ of the embodiment shown in FIG. 1. The first alternate modifying means shown in FIG. 2 also includes a modifying spring 167 which has a greater preload than the spring 67 of the embodiment shown in FIG. 1.

FIG. 3 shows a second alternate control spool and modifying means for use in the bore 52 in the housing 18 shown in FIG. 1. As shown in FIG. 3, a control spool 256 has a left spool portion 258 which is identical to the left spool portion 58 of the embodiment shown in FIG. 1. The second alternate control spool 256 also includes a right spool portion 259 having a net lateral cross-sectional area $A_2''$ exposed to trapped volume pressure under all conditions. The area $A_2''$ is substantially greater than the area $A_2$ of the embodiment shown in FIG. 1.

The second alternate modifying means shown in FIG. 3 includes an annular seal 265 and a modifying sleeve 266 having a net lateral cross-sectional area $A_3''$ exposed at its right end to trapped volume chamber pressure under all conditions and exposed at its left end to return passage pressure under all conditions. The area $A_3''$ is substantially less than the area $A_3$ of the embodiment shown in FIG. 1. The modifying means shown in FIG. 3 also includes a modifying spring 267. The modifying spring 267 has a preload which is less than the preload of the spring 67 of the embodiment shown in FIG. 1.

Turning now to the operation of the circuit shown in FIG. 1, all of the components assume the at rest positions shown in FIG. 1 when the pump 11 is deactuated such as when the engine of the motor vehicle (not shown) which drives the pump 11 is not running and the brake pedal 33 is deactuated. In this position, the control spool 56 of the control valve 16 is biased to the rightmost position shown in FIG. 1 by the spring 57.

In this at rest or deactuated position, the return spring of the master cylinder of the motor vehicle (not shown) acts against the master cylinder actuating rod 24 in cooperation with the spring 27 to return the power piston 25 to the position shown in the drawings. The spring 40 acting against the left end face of the input rod 31 holds the input rod 31 to the right against the snap ring at the rightmost end of the bore 23. In this position, the seal 41 is disposed to the right of the return passage 42 to provide open fluid pressure communication between the trapped volume chamber 30 and the return line 14.

When the pump 11 begins to operate and the steering valve 12 and brake booster 15 are both deactuated, the control spool 56 of the control valve 16 remains at its at rest position shown in FIG. 1. In this at rest position, the right edge of the first land 60 prevents the flow of fluid from the pump 11 and the pump passage 68 to the inlet passage 43 and the power chamber 26 of the brake booster 15. In this position of the control spool 56, the left edge of the first land 60 directs the entire output flow from the pump 11 to the steering valve 12 through the steering valve passage 63. The left edge of the second land 61 of the control spool 56 in this position connects the power chamber 26 to the return line 14 through the return passage 42.

When the pump 11 is operating and the operator begins to push on the brake pedal 33, a force on the order of approximately five pounds is required to overcome the frictional forces and the force of the spring 40. As forces in excess of five pounds are exerted, the brake pedal 33 begins to move the input rod 31 to the left, and the seal 41 crosses the return passage 42 to hydraulically isolate the trapped volume chamber from the return passage 42. This occurs before the input rod 31 engages the output rod 38, and the force of the spring 40 acting against the output rod 38 is insufficient to overcome the force of the return spring 27 so that the output rod 38 remains stationary. At this point, the control spool 56 of the control valve 16 is still in its rightward position shown in FIG. 1.

Further movement of the input rod 31 to the left as viewed in FIG. 1 begins to build pressure in the trapped volume chamber 30. If the modifying means comprising the seal 65 and sleeve 66 and spring 67 were not present and the bore 52 was of cross-sectional area $A_1$ for its entire extent so that the third land 62 was disposed therein with a lap-fit, the force of the spring 57 would be overcome by the trapped volume pressure acting against the area $A_2$. The left edge of the second land 61 would then close communication between the booster passage 43 and the return passage 42. The right edge of the first land 60 would then open communication between the pump passage 68 and the booster passage 43, and the left edge of the first land 60 would begin to restrict the flow of fluid from the pump 11 to increase the outlet pressure of the pump 11. Further increases in trapped volume chamber pressure would then result in equal increases in brake booster pressure to balance the spool 56 to satisfy the following equation:

$$P_b A_1 + F_{57} = P_{tv} A_2$$

where:

$P_b$ is the booster pressure acting to the right on the area $A_1$ of the control spool 56;

$F_{57}$ is the force acting to the right on the control spool 56 by the spring 57; and $P_{tv}$ is the trapped volume pressure acting to the left against the area $A_2$.

The presence of the modifying means comprising the seal 65 and sleeve 66 and spring 67 alters this relationship between increases in trapped volume pressure and increases in brake booster pressure at low brake pedal efforts below approximately fifteen pounds. The modifying means at such low brake pedal efforts causes increases in trapped volume chamber pressure to produce greater increases in brake booster pressure. This permits a relatively low brake pedal effort to produce relatively high brake booster pressure. When this system is used in a passenger car having an automatic transmission, this permits a very light pedal effort to prevent creeping of the motor vehicle when the transmission is engaged and the engine is running at idle speed with the vehicle stopped.

The modifying means accomplishes this by providing an additional area $A_3$ which is acted by the trapped volume pressure to create an additional force acting through the spring 67 to urge the control spool 56 to the left. Thus, the modifying means of the present invention alters the operation of the control spool 56 so that the control spool 56 moves in the bore 52 to balance the following equation of forces acting in opposite directions thereon:

$$P_b A_1 + F_{57} = P_{tv} (A_2 + A_3).$$

In this manner, small increases in pressure in the trapped volume chamber urge the control spool 56 to the left to increase the pressure supplied to the brake booster power chamber 26 until the increased brake booster pressure acting on the smaller area $A_1$ is sufficient to balance the control spool 56.

When higher brake pedal efforts greater than approximately fifteen pounds are reached, the force created by the trapped volume chamber pressure acting on the annular area $A_3$ is sufficient to overcome the preload of the spring 67. This causes the seal 65 and modifying sleeve 66 to move to the left in the bore 52 relative to the control spool 56 until the left end of the modifying sleeve 66 engages the abutment member 54. Thereafter, the seal 65 and modifying sleeve 66 do not further alter the operation of the control spool 56. Further increases in trapped volume chamber pressure provide equal increases in brake booster pressure since the area $A_2$ is equal to the area $A_1$, to balance the forces acting in opposite directions on the control spool 56 according to the following equation:

$$P_b A_1 + F_{57} = P_{tv} A_2 + F_{67}$$

where:

$F_{67}$ is the force created by the spring 67 acting to the left on the control spool 56.

When the brakes of the vehicle have been actuated and the force on the brake pedal 33 is diminished, the diminished force on the input rod 31 will decrease the pressure in the trapped volume chamber 30. This decreased pressure acting on the right end of the control spool 56 permits the booster pressure acting on the left end of the control spool 56 to move the control spool 56 to the right. When this occurs the right edge of the first land 60 maintains closed communication between the outlet side of the pump 11 and the power chamber 26, while the left edge of the second land 61 opens restricted fluid pressure communication between the power chamber 26 and the return passage 42 to correspondingly decrease the pressure in the power chamber 26. The decreased pressure in the power chamber 26 permits the return spring of the master cylinder (not shown) and the return spring 27 of the brake booster to move the power piston 25 and the output rod 38 to the right as viewed in FIG. 1. This causes a corresponding movement of the input rod 31 to the right, until the brakes are fully released and the seal 41 opens the return passage 42 to hydraulically connect the trapped volume chamber 30 to the return line 14.

The relationship between brake pedal effort on the brake pedal 33 and output force of the master cylinder actuating rod 24 in the circuit shown in FIG. 1 can easily be changed without alteration to the housing 18 or to the input rod 31 or output rod 38 or power piston 25. This is accomplished by replacing the original control spool and modifying means shown in FIG. 1 with either of the alternate control spools and modifying means shown in FIGS. 2 and 3. If it is desired to decrease the output force of the master cylinder actuating rod 24 for a given brake pedal effort, the alternate control spool and modifying means shown in FIG. 2 is substituted for the original control spool and modifying means shown in FIG. 1. This could occur when the circuit is used in a smaller motor vehicle which requires less force on its master cylinder to provide a given brake line pressure because the master cylinder is of smaller lateral cross-sectional area. On the other hand, if it is desired to increase the output force of the master cylinder actuating rod 24 for a given pedal effort, the second alternate control spool modifying means shown in FIG. 3 is substituted for that shown in FIG. 1. The second alternate control spool and modifying means could be used when the circuit is used in a larger motor vehicle which requires a greater force on its master cylinder to provide a given brake line pressure because the master cylinder is of larger lateral cross sectional area.

Referring now to the operation of the circuit when the first alternate control spool and modifying means of FIG. 2 are substituted for the original control spool and modifying means shown in FIG. 1, low brake pedal efforts cause the control spool 156 to move in the bore 52 to balance the following equation of forces acting in opposite directions thereon:

$$P_b A_1 + F_{57} = P_{tr} (A_2' + A_3').$$

Because the sum of the areas $A_2'$ and $A_3'$ of FIG. 2 is the same as the sum of the areas $A_2$ and $A_3$ of the original control spool and modifying means shown in FIG. 1, this portion of the operation of the circuit is identical to the operation of the circuit shown in FIG. 1. Under these conditions, small increases in pressure in the trapped volume chamber urge the control spool 156 to the left to provide greater increases in the pressure supplied to the brake booster power chamber 26 until the increased brake booster pressure acting on the smaller area $A_1$ is sufficient to balance the control spool 156.

When the first alternate control spool and modifying means of FIG. 2 is utilized and higher brake pedal efforts greater than approximately fifteen pounds are reached, the force created by the trapped volume chamber pressure acting on the annular area $A_3'$ is sufficient to overcome the preload of the spring 167. This causes the seal 165 and modifying sleeve 166 to move to the left in the bore 52 relative to the control spool 156 until the left end of the modifying sleeve 166 engages the abutment 54. Thereafter, the seal 165 and modifying sleeve 166 do not further alter the operation of the control spool 156. Further increases in trapped volume chamber pressure provide proportional but smaller increases in brake booster pressure since the area $A_2'$ is less than the area $A_1$, to balance the forces acting in opposite directions on the control spool 156 according to the following equation:

$$P_b A_1 + F_{57} = P_{tr} A_2' + F_{167}.$$

where:
$F_{167}$ is the force created by the spring 167 acting to the left on the control spool 156.

In this manner, the first alternate control spool modifying means of FIG. 2 provides a smaller output force on the master cylinder actuating rod 24 for a given brake pedal effort than the original control spool modifying means shown in FIG. 1 at high brake pedal efforts.

Referring now to the operation of the circuit when the second alternate control spool and modifying means of FIG. 3 are substituted for the original control spool and modifying means shown in FIG. 1, low brake pedal efforts cause the control spool 256 to move in the bore 52 to balance the following equation of forces acting in opposite directions thereon:

$$P_b A_1 + F_{57} = P_{tr} (A_2'' + A_3'').$$

Because the sum of the areas $A_2''$ and $A_3''$ of FIG. 3 is the same as the sum of the areas $A_2$ and $A_3$ of the original control spool and modifying means shown in FIG. 1, this portion of the operation of the circuit is identical to the operation of the circuit shown in FIG. 1. Under these conditions, small increases in pressure in the trapped volume chamber urge the control spool 256 to the left to provide greater increases in the pressure supplied to the brake booster power chamber 26 until the increased brake booster pressure acting on the smaller area $A_1$ is sufficient to balance the control spool 256.

When the second alternate control spool and modifying means of FIG. 3 is utilized and higher brake pedal efforts greater than approximately fifteen pounds are reached, the force created by the trapped volume chamber pressure acting on the annular area $A_3''$ is sufficient to overcome the preload of the spring 267. This causes the seal 265 and modifying sleeve 266 to move to the left in the bore 52 relative to the control spool 256 until the left end of the modifying sleeve 266 engages the abutment 54. Thereafter, the seal 265 and modifying sleeve 266 do not further alter the operation of the control spool 256. Further increases in trapped volume chamber pressure provide proportional but larger increases in brake booster pressures since the area $A_2''$ is less than area $A_1$, to balance the forces acting in opposite directions on the control spool 256 according to the following equation:

$$P_b A_1 + F_{57} = P_{tr} A_2'' + F_{267}.$$

where:
$F_{267}$ is the force created by the spring 267 acting to the left on the control spool 256.

In this manner, the second alternate control spool modifying means of FIG. 2 provides a greater output force on the master cylinder actuating rod 24 for a given brake pedal effort than the control spool and modifying means shown in FIG. 1.

In the event the pump 11 is not operating, whether by failure of the pump 11 or stalling of the engine of the vehicle or loss of fluid from the system or any other reason, the ratio override valve 17 releases the pressure in the trapped volume chamber 30. This is because initial trapped volume chamber pressure acting against the smaller diameter portion of the override piston 70 moves the piston 70 to the left position to connect the trapped volume chamber 30 to the return passage 42 through the control and override passage 44. When this occurs, further actuation of the brake pedal 33 causes the input rod 31 to move to the left until its left end face mechanically engages the right end face of the output rod 38. Further movement of the input rod 31 to the left moves the output rod 38 and power piston 25 to the left to manually and without power assist actuate the brakes of the vehicle. In this manner, the ratio override valve 17 eliminates the hydraulic ratio between the movement of the input rod 31 and the output rod 38 so that a one to one ratio of such movement is established. By eliminating the hydraulic ratio, a greater mechanical advantage between the brake pedal 33 and the master cylinder actuating rod 24 is provided for manual actuation of the brakes.

What is claimed is:

1. In a motor vehicle, a fluid power circuit comprising a pump having an inlet side and an outlet side, a control valve, a brake booster, and conduit means hydraulically connecting said pump and control valve and brake booster; said brake booster including a housing having a bore extending therethrough, a power piston slidably disposed in said bore, a power chamber in said bore on one side of said power piston, a trapped volume chamber in said housing, an output rod on said one side of said power piston extending into said trapped volume chamber and having a predetermined lateral cross-sectional area exposed to a fluid pressure level in said trapped volume chamber, an input rod slidably disposed for movement to and from a deactuated position in said housing and extending into said trapped volume chamber, said input rod having a predetermined lateral cross-sectional area exposed to the fluid pressure level in said trapped volume chamber, said input rod area being substantially greater than said output rod area and being constructed and arranged such that movement of said input rod in said trapped volume chamber results in proportional but larger movement of said output rod when the volume of fluid in said trapped volume chamber remains substantially constant, a brake pedal operatively connected to said input rod for moving said input rod in said trapped volume chamber; said control valve including a control spool bore and a control spool slidably disposed in said control spool bore, brake booster valve means on said control spool movable toward and away from a fully open position controlling fluid pressure communication between said pump outlet side and said brake booster power chamber, said control spool having first and second opposite lateral end faces, passage means maintaining open fluid pressure communication between said first end face and the fluid pressure of said power chamber under all normal operating conditions, further passage means maintaining open fluid pressure communication between said second end face and the fluid pressure of said trapped volume chamber under all normal operating conditions, said brake booster valve means being constructed and arranged so that said power chamber fluid pressure acting against said first end face urges said brake booster valve means away from said fully open position and so that said trapped volume fluid pressure acting against said second end face urges said brake booster valve means toward said fully open position, control spool modifying means slidably disposed in said control spool bore, said control spool modifying means having a modifying area, said further passage means maintaining open fluid pressure communication between said modifying area and the fluid pressure of said trapped volume chamber under all normal operating conditions, said control spool modifying means having connector means operatively connecting said modifying area to said control spool, said connector means being constructed and arranged to transmit the force of said trapped volume chamber pressure acting against said modifying area to said control spool when the force exerted on said brake pedal is less than a predetermined force to urge said brake booster valve means toward said fully open position, and said control spool modifying means including stop means exterior of said control spool rendering said modifying area inoperable to further increase the force transmitted through said connector means to said valve spool when said force exerted on said brake pedal is greater than said predetermined force.

2. A fluid power circuit as set forth in claim 1 wherein said control spool bore is a stepped bore having a nominal diameter portion and a larger diameter portion, said first end face is disposed in said nominal diameter portion and has a predetermined net lateral cross sectional area exposed to said power chamber pressure through said passage means, said second end face is disposed in said larger diameter portion and has a predetermined net lateral cross sectional area exposed to said trapped volume chamber pressure through said further passage means, said modifying area is an annular area concentrically disposed around said second end face in said larger diameter portion, and said annular modifying area has a predetermined net lateral cross sectional area exposed to said trapped volume pressure through said further passage means.

3. A fluid power circuit as set forth in claim 2 wherein said control spool and modifying means are removably disposed in said control spool bore, whereby said control spool and modifying means are replaceable with an alternate control spool and modifying means for providing a changed relationship between the force exerted on said brake pedal and the pressure in said power chamber when said brake pedal force exceeds said predetermined force.

4. A fluid power circuit as set forth in claim 2 wherein said control spool includes a first land in said nominal diameter portion of said bore, a second land in said nominal diameter portion of said bore, and a third land in said enlarged diameter portion of said bore, one of said first and second lands providing said brake booster valve means, and said third land providing a cylindrical surface upon which said annular modifying area is disposed.

5. A fluid power circuit as set forth in claim 4 wherein said control spool includes a first cylindrical spool portion and a second cylindrical spool portion, said first and second spool portions are disjoined from one another, said first spool portion is disposed in said nominal diameter portion of said bore, said first spool portion includes said first end face and said first land and said second land, said second spool portion is disposed in said enlarged diameter portion of said bore, and said second spool portion includes said second end face and said third land.

6. A fluid power circuit as set forth in claim 5 wherein said modifying means is an annular sleeve disposed in said enlarged diameter portion of said bore exteriorly of said second spool portion, said connector means includes a preloaded compression spring disposed on said first spool portion and an abutment member slightly disposed on said first spool portion, and said abutment member engages said annular sleeve and said compression spring to operatively connect said annular sleeve and said compression spring.

7. In combination, a brake booster, a control spool bore, and a control spool and modifying means; said brake booster including a housing having a bore extending therethrough, a power piston slidably disposed in said bore, a power chamber in said bore on one side of said power piston, a trapped volume chamber in said housing, an output rod on said one side of said power piston extending into said trapped volume chamber and having a predetermined lateral cross-sectional area exposed to a fluid pressure level in said trapped volume chamber, an input rod slidably disposed for movement to and from a deactuated position in said housing and extending into said trapped volume chamber, said input rod having a predetermined lateral cross-sectional area exposed to the fluid pressure level in said trapped volume chamber, said input rod area being substantially greater than said output rod area and being constructed and arranged such that movement of said input rod in said trapped volume chamber results in proportional but larger movement of said output rod when the volume of fluid in said trapped volume chamber remains substantially constant, a brake pedal operatively connected to said input rod for moving said input rod in said trapped volume chamber, a drain passage, said control spool and modifying means being slidably disposed in said control spool bore, said control spool including brake booster valve means controlling fluid flow to said brake booster power chamber, said control spool having first and second opposite lateral end faces, passage means maintaining open fluid pressure communication between said first end face of said control spool and the fluid pressure of said power chamber under all normal operating conditions, further passage means maintaining open fluid pressure communication between said second end face of said control spool and the fluid pressure of said trapped volume chamber under all normal operating conditions, said brake booster valve means being constructed and arranged so that said power chamber fluid pressure acting against said first end face of said control spool urges said brake booster valve means away from said fully open position and so that said trapped volume fluid pressure acting against said second end face of said control spool urges said brake booster valve means toward said fully open position, said control spool modifying means having a modifying area and a drain pressure area, said further passage means maintaining open fluid pressure communication between said modifying area of said modifying means and the fluid pressure of said trapped volume chamber under all normal operating conditions, means maintaining open fluid pressure communication between said drain pressure area and said drain passage under all normal operating conditions, said control spool modifying means having connector means operatively connecting said modifying area to said control spool, said connector means being constructed and arranged to transmit the force of said trapped volume chamber pressure acting against said modifying area to said control spool when said force exerted on said brake pedal is less than a predetermined force to urge said brake booster valve means toward said fully open position, said control spool bore being a stepped bore having a nominal diameter portion and a larger diameter portion, said first end face of said control spool being disposed in said nominal diameter portion and having a predetermined net lateral cross sectional area exposed to said power chamber pressure through said passage means, said second end face of said control spool being disposed in said larger diameter portion and having a predetermined net lateral cross sectional area exposed to said trapped volume chamber pressure through said further passage means, said modifying area of said modifying means being an annular area concentrically disposed around said second end face in said larger diameter portion, said annular modifying area of said modifying means having a predetermined net lateral cross sectional area exposed to said trapped volume pressure through said further passage means.

8. In a motor vehicle, a fluid power circuit comprising a pump having an inlet side and an outlet side, a control valve, a steering valve having an inlet side and an outlet side, a brake booster, and conduit means hydraulically connecting said pump and control valve and steering valve and brake booster; said brake booster including a housing have a bore extending therethrough, a power piston slidably disposed in said bore, a power chamber in said bore on one side of said power piston, a trapped volume chamber in said housing, an output rod on said one side of said power piston extending into said trapped volume chamber and having a predetermined lateral cross-sectional area exposed to a fluid pressure level in said trapped volume chamber, an input rod slidably disposed for movement to and from a deactuated position in said housing and extending into said trapped volume chamber, said input rod having a predetermined lateral cross-sectional area exposed to the fluid pressure level in said trapped volume chamber, said input rod area being substantially greater than said output rod area and being constructed and arranged such that movement of said input rod in said trapped volume chamber results in proportional but larger movement of said output rod when the volume of fluid in said trapped volume chamber remains substantially constant, a brake pedal operatively connected to said input rod for moving said input rod in said trapped volume chamber; said control valve including a control spool bore and a control spool slidably disposed in said control spool bore, brake booster valve means on said control spool movable toward and away from a fully open position controlling fluid pressure communication between said pump outlet side and said brake booster power chamber, steering valve valve means on said control spool movable toward and away from a fully open position controlling fluid pressure communication between said pump outlet side and said steering valve inlet side, said control spool having first and second opposite lateral end faces, passage means maintaining open fluid pressure communication between said first end face and the fluid pressure of said power chamber under all normal operating conditions, further passage means maintaining open fluid pressure communication between said second end face and the fluid pressure of said trapped volume chamber under all normal operating conditions, said brake booster valve means being constructed and arranged so that said power chamber fluid pressure acting against said first end face urges said brake booster valve means away from said fully open position and so that said trapped volume fluid pressure acting against said second end face urges said brake booster valve means toward said fully open position, control spool modifying means slidably disposed in said control spool bore, said control spool modifying means having a modifying area, said further passage means maintaining open fluid pressure communication between said modifying area and the fluid pressure of said trapped volume chamber under all normal operating conditions, said control spool modifying means having connector means operatively connecting said modifying area to said control spool, said connector means being constructed and arranged to transmit the force of said trapped volume chamber pressure acting against said modifying area to said control spool when said force exerted on said brake pedal is less than a predetermined force to urge said brake booster valve means toward said fully open position, and said control spool modifying means including stop means exterior of said control spool rendering said modifying area inoperable to further increase the force transmitted through said connector means to said valve spool when said force exerted on said brake pedal is greater than said predetermined force.

9. A fluid power circuit as set forth in claim 8 wherein said modifying means further includes a drain pressure area and means maintaining open fluid pressure communication between said pump inlet side and said drain pressure area under all normal operating conditions.

10. A fluid power circuit as set forth in claim 9 wherein said control spool bore is a stepped bore having a nominal diameter portion and an enlarged diameter portion, said first end face is disposed in said nominal diameter portion, said second end face is disposed in said enlarged diameter portion, and said modifying means is disposed in said enlarged diameter portion.

11. A fluid power circuit as set forth in claim 10 wherein said modifying means includes an annular sleeve disposed in said enlarged diameter portion of said control spool bore, said sleeve being concentrically disposed on said control spool, and said modifying area being the annular lateral cross sectional area of said sleeve exposed to trapped volume pressure.

12. A fluid power circuit as set forth in claim 11 wherein said connector means includes a spring operatively extending between said sleeve and said control spool to transmit forces from said sleeve to said control spool in a direction to urge said brake booster valve means toward said fully open position.

13. In a motor vehicle, a fluid power circuit comprising a pump having an inlet side and an outlet side, a control valve, a steering valve having an inlet side and an outlet side, a brake booster, and conduit means hydraulically connecting said pump and control valve and steering valve and brake booster; said brake booster including a housing having a bore extending therethrough, a power piston slidably disposed in said bore, a power chamber in said bore on one side of said power piston, a trapped volume chamber in said housing, an output rod on said one side of said power piston extending into said trapped volume chamber and having a predetermined lateral cross-sectional area exposed to a fluid pressure level in said trapped volume chamber, an input rod slidably disposed for movement to and from a deactuated position in said housing and extending into said trapped volume chamber, said input rod having a predetermined lateral cross-sectional area exposed to the fluid pressure level in said trapped volume chamber, said input rod area being substantially greater than said output rod area and being constructed and arranged such that movement of said input rod in said trapped volume chamber results in proportional but larger movement of said output rod when the volume of fluid in said trapped volume chamber remains substantially constant, a brake pedal operatively connected to said input rod for moving said input rod in said trapped volume chamber; said control valve including a stepped control spool bore having a nominal diameter portion and a larger diameter portion, a control spool slidably disposed in said control spool bore, brake booster inlet valve means on said control spool in said nominal diameter portion of said bore movable toward and away from a fully open position controlling fluid pressure communication between said pump outlet side and said brake booster power chamber, brake booster outlet valve means on said control spool in said nominal diameter portion of said bore movable toward and away from a fully open position controlling fluid pressure communication between said pump inlet side and said brake booster power chamber, steering valve valve means on said control spool in said nominal diameter portion of said bore movable toward and away from a fully open position controlling fluid pressure communication between said pump outlet side and said steering valve inlet side, said control spool having first and second opposite lateral end faces, said first end face being disposed in said nominal diameter portion of said bore, passage means maintaining open fluid pressure communication between said first end face and the fluid pressure of said power chamber under all normal operating conditions, said second end face being disposed in said larger diameter portion of said bore, further passage means maintaining open fluid pressure communication between said second end face and the fluid pressure of said trapped volume chamber under all normal operating conditions, said brake booster inlet valve means being constructed and arranged so that said power chamber fluid pressure acting against said first end face urges said brake booster inlet valve means away from said fully open position and so that said trapped volume fluid pressure acting against said second end face urges said brake booster inlet valve means toward said fully open position, control spool modifying means slidably disposed in said larger diameter portion of said control spool bore exteriorly of said second end face, said control spool modifying means having an annular modifying area, said further passage means maintaining open fluid pressure communication between said modifying area and the fluid pressure of said trapped volume chamber under all normal operating conditions, said control spool modifying means having connector means operatively connecting said modifying area to said control spool, said connector means being constructed and arranged to transmit the force of said trapped volume chamber pressure acting against said modifying area to said control spool when said force exerted on said brake pedal is less than a predetermined force to urge said brake booster valve means toward said fully open position.

14. In a motor vehicle, a fluid power circuit as set forth in claim 13 wherein said control spool includes a first land in said nominal diameter portion of said bore, a second land in said nominal diameter portion of said bore, and a third land in said enlarged diameter portion of said bore, said first and second lands provide said brake booster inlet valve means and said brake booster outlet valve means and said steering valve valve means, and said third land provides a cylindrical surface upon which said annular modifying area is disposed.

15. In a motor vehicle, a fluid power circuit as set forth in claim 14 wherein said control spool includes a first cylindrical spool portion and a second cylindrical spool portion, said first and second spool portions are disjoined from one another, said first spool portion is disposed in said nominal diameter portion of said bore, said first spool portion includes said first end face and said first land and said second land, said second spool portion is disposed in said enlarged diameter portion of said bore, and said second spool portion includes said second end face and said third land.

16. In a motor vehicle, a fluid power circuit as set forth in claim 15 wherein said modifying means is an annular sleeve disposed in said enlarged diameter portion of said bore exteriorly of said second spool portion, said connector means includes a preloaded compression spring disposed on said first spool portion and an abutment member slidably disposed on said first spool portion, and said abutment member engages said annular sleeve and said compression spring to operatively connect said annular sleeve and said compression spring.

* * * * *